(12) United States Patent
Gotou

(10) Patent No.: US 6,963,152 B2
(45) Date of Patent: Nov. 8, 2005

(54) MOTOR DEVICE HAVING SLIDABLE GUIDE PORTIONS

(75) Inventor: Yasuo Gotou, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 10/208,194

(22) Filed: Jul. 31, 2002

(65) Prior Publication Data

US 2003/0025411 A1 Feb. 6, 2003

(30) Foreign Application Priority Data

Aug. 3, 2001 (JP) ........................... 2001-236825
Aug. 10, 2001 (JP) ........................... 2001-244861

(51) Int. Cl.[7] ........................... H02K 5/00; B23P 19/00
(52) U.S. Cl. ........................... 310/89; 310/42; 29/596; 29/700
(58) Field of Search ........................... 29/700, 596; 310/89, 310/42, 67 R, 75 R, 79

(56) References Cited

U.S. PATENT DOCUMENTS 6,073,746 A  6/2000 Oshiro et al.
6,229,233 B1 * 5/2001 Torii et al. ............... 310/75 R
6,380,650 B1 * 4/2002 Kiuchi et al. ............... 310/89

FOREIGN PATENT DOCUMENTS

JP   A-2000-16127   1/2000

* cited by examiner

Primary Examiner—Burton S. Mullins
Assistant Examiner—Heba Elkassabgi
(74) Attorney, Agent, or Firm—Posz Law Group, PLC

(57) ABSTRACT

A motor device used in a power seat device for an automobile includes a motor yoke, a resin-made end frame for closing a cavity portion of a motor and a resin-made gear box. The end frame is formed with guide portions utilized in transferring the motor in manufacturing the motor. At least one of the guide portions is formed with an inserting portion capable of inserting a fixing member for attachment of a fixing portion of the motor yoke and a fixed portion of the end frame. An engaging portion in a projected shape is formed at one of the end frame and the gear box, and an engaging portion in a recessed shape to which the engaging portion in the projected shape is fitted is formed at the other thereof.

14 Claims, 14 Drawing Sheets

MOTOR DEVICE HAVING SLIDABLE GUIDE PORTIONS

FIELD OF THE INVENTION

The present invention relates to a motor device and a method of manufacturing the same. Particularly, the invention relates to a motor device having a guide portion in which an end frame made of a resin is engaged with a motor transfer rail, and a motor device made of a resin in which a gear box and a gear box connecting portion of a motor are made of resin.

BACKGROUND OF THE INVENTION

Generally, according to a motor device used in a power seat device, a power window device or the like, a motor yoke and an end frame (housing)for closing an end portion of the motor yoke in an axial direction are coupled by crimping portions at three locations. However, the crimping portions are not formed at symmetrical positions relative to a motor rotating shaft, that is, at every 120 degrees centering on the rotating shaft. Therefore, angles of crimping are not uniform in a peripheral direction of the motor yoke and the crimp holding force of the motor yoke becomes nonuniform. When the crimping portions are formed at every 120 degrees centering on a rotating axis of the crimping portions, it is likely that a portion of the crimping portion positionally interferes with a guide portion formed on the end frame to engage with a transfer rail in manufacturing. Therefore, a length of the guide portion in a transfer direction cannot be made large. When the end frame is engaged with the transfer rail, the end frame cannot be moved to slide stably.

Further, when the end frame and the gear box are connected, axes thereof are deviated from each other. This brings about a disadvantage in a function such as operating sound or properties of the motor. Therefore, as shown by FIG. 18, when a resin-made end frame 41 is fitted with a bearing metal 42, there is a technology of forming a section of a fitting portion 41a of the resin-made end frame 41 not in a complete circle shape but in a polygonal shape. By forming the fitting portion 41a in the polygonal shape, an outer peripheral face of the bearing metal 42 is brought into contact with the fitting portion 41a by respective plane portion thereof in the polygonal shape. The axis center alignment of the fitting portion 41a and the bearing metal 42 can be carried out by partially establishing the accuracy by cutting to adjust a mold for forming the plane portions. Therefore, the axis center accuracy can be adjusted comparatively easily in comparison with the case of forming the section of the fitting portion 41a by a complete circle shape. However, it is desired to enable to adjust the axis center accuracy further easily.

SUMMARY OF THE INVENTION

It is an object of the invention to provide a motor device capable of fixing a motor yoke and an end frame uniformly in a peripheral direction of the motor yoke. In order to achieve this object, according to the invention, the end frame of the motor is formed with guide portions utilized in transferring the motor. At least one of the guide portions is formed with an inserting portion capable of inserting a fixing member for attachment of a fixing portion of the motor yoke and a fixed portion of the end frame.

It is another object of the invention to provide a motor device capable of directly integrating the motor and the gear box while maintaining high axis center accuracy. In order to achieve this object, according to the invention, one of an end frame made of a resin and a gear box made of a resin, is provided with an engaging portion in a projected shape and the other thereof is provided with an engaging portion in a recessed shape to be fitted to the engaging portion in the projected shape. Either one of the engaging portion in the projected shape or the engaging portion in the recessed shape includes a plurality of projected portions along a direction of a rotating shaft at a face thereof to be bonded with other of the engaging portions. The other of the engaging portion in the projected shape or the engaging portion in the recessed shape is provided with a plurality of plane portions brought into contact with the projected portions. Thereby, adjustment of axis centers of the end frame and the gear box can easily be carried out by adjusting a projected portion and a plane portion of molds for forming these.

DETAILED DESCRIPTION OF THE PREFERRED EMBODIMENTS

A detailed explanation will of embodiments of the invention will be given with reference to the drawings.

(First Embodiment)

Figure 1:
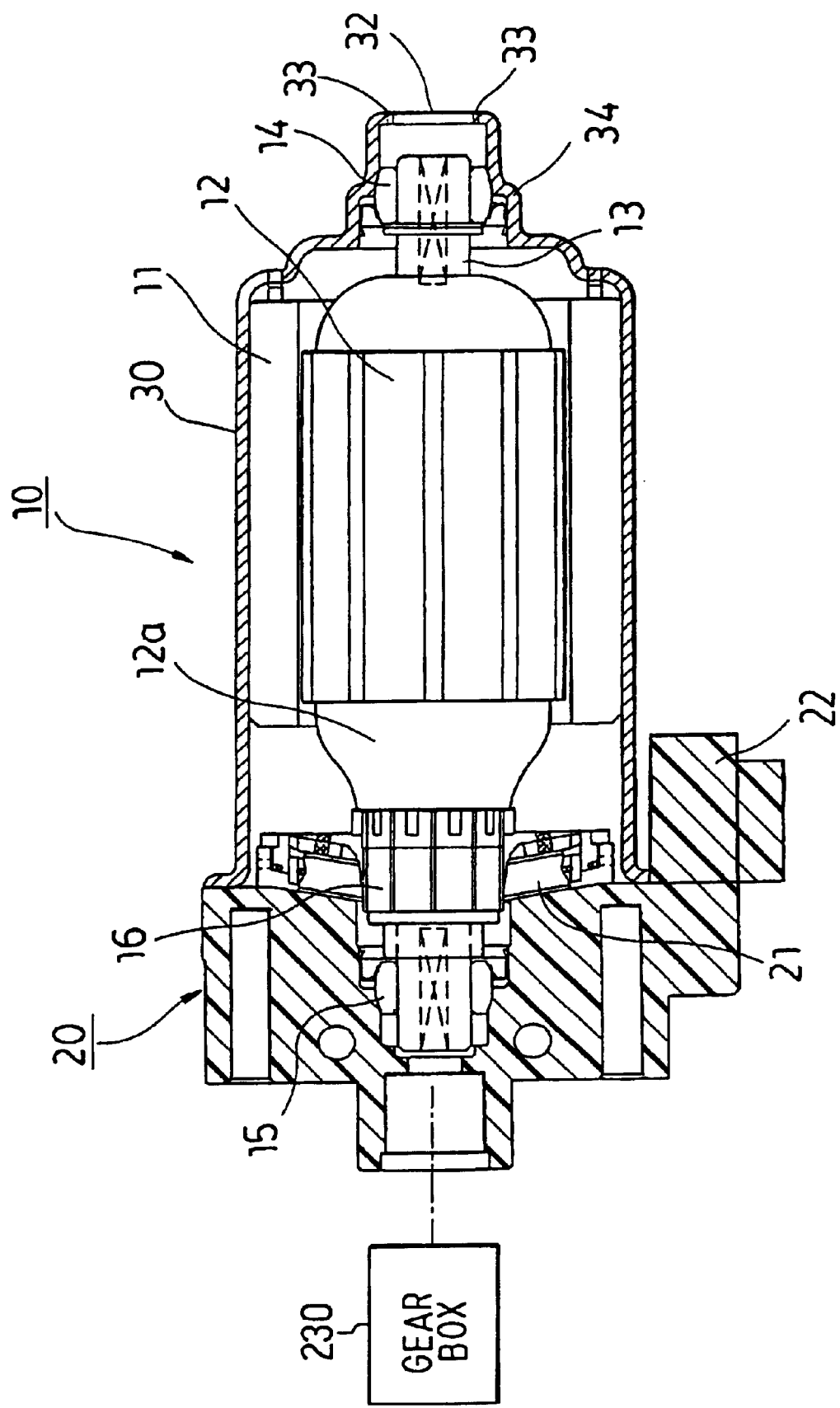
FIG. 1 is a sectional view of a motor device according to a first embodiment of the invention.

As shown by FIG. 1, a motor 10 used as a motor device for a power seat for an automobile is provided with magnets 11 in a circular arc shape. The motor yoke 30, which is made of metal, has a cavity portion 30b for containing an armature 12 having a winding 12a, a shaft 13 of the armature 12, bearings 14 and 15 for axially supporting the shaft 13, and a commutator 16 arranged on one end side of the shaft 13. The cavity portion 30b is closed by an end frame 20, which is a housing made of resin. The fixed portion 20a of the end frame 20 is attached to a fixing portion 30a formed at the motor yoke 30. The shaft 13 is connected to a gearbox 230 (refer to FIG. 11).

Figure 2:
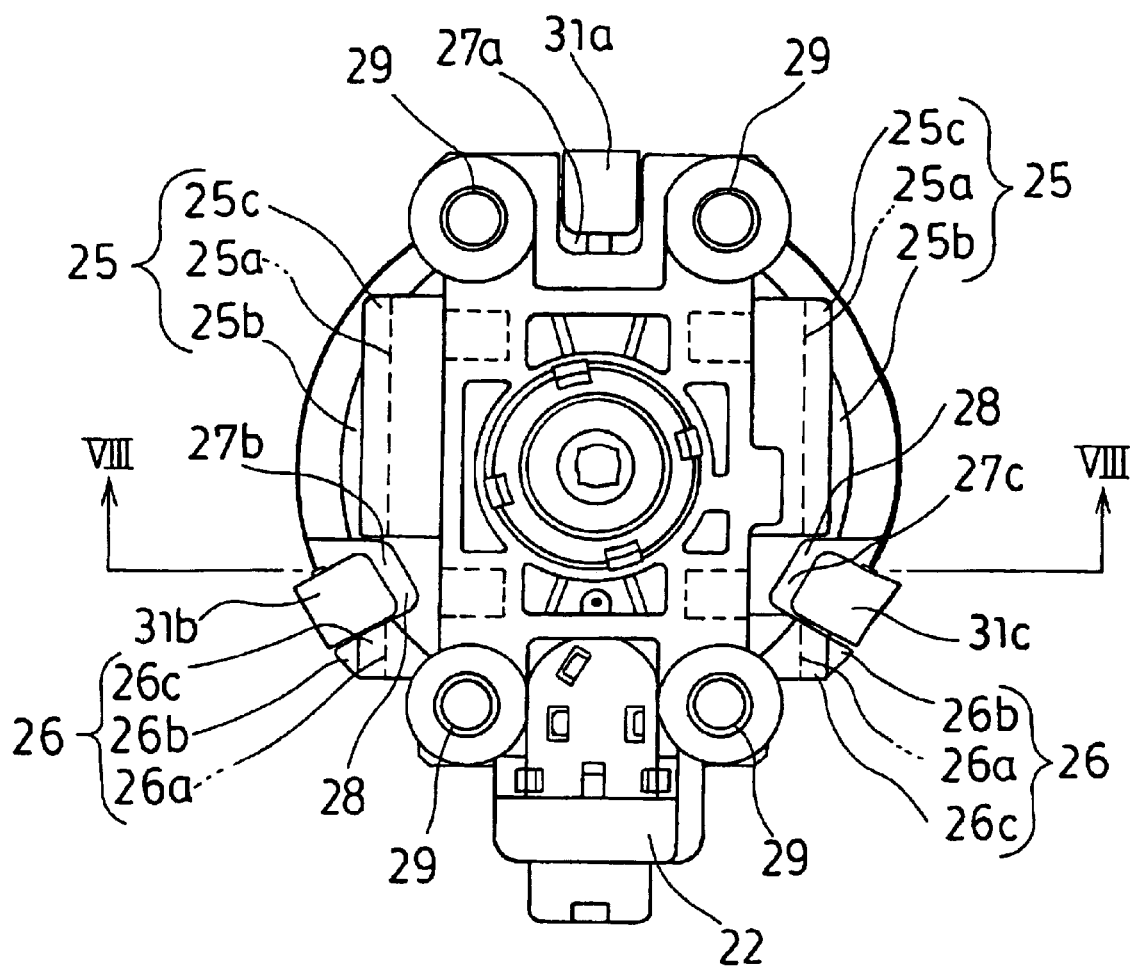
FIG. 2 is a left side view of the motor device according to the first embodiment.
Figure 3:
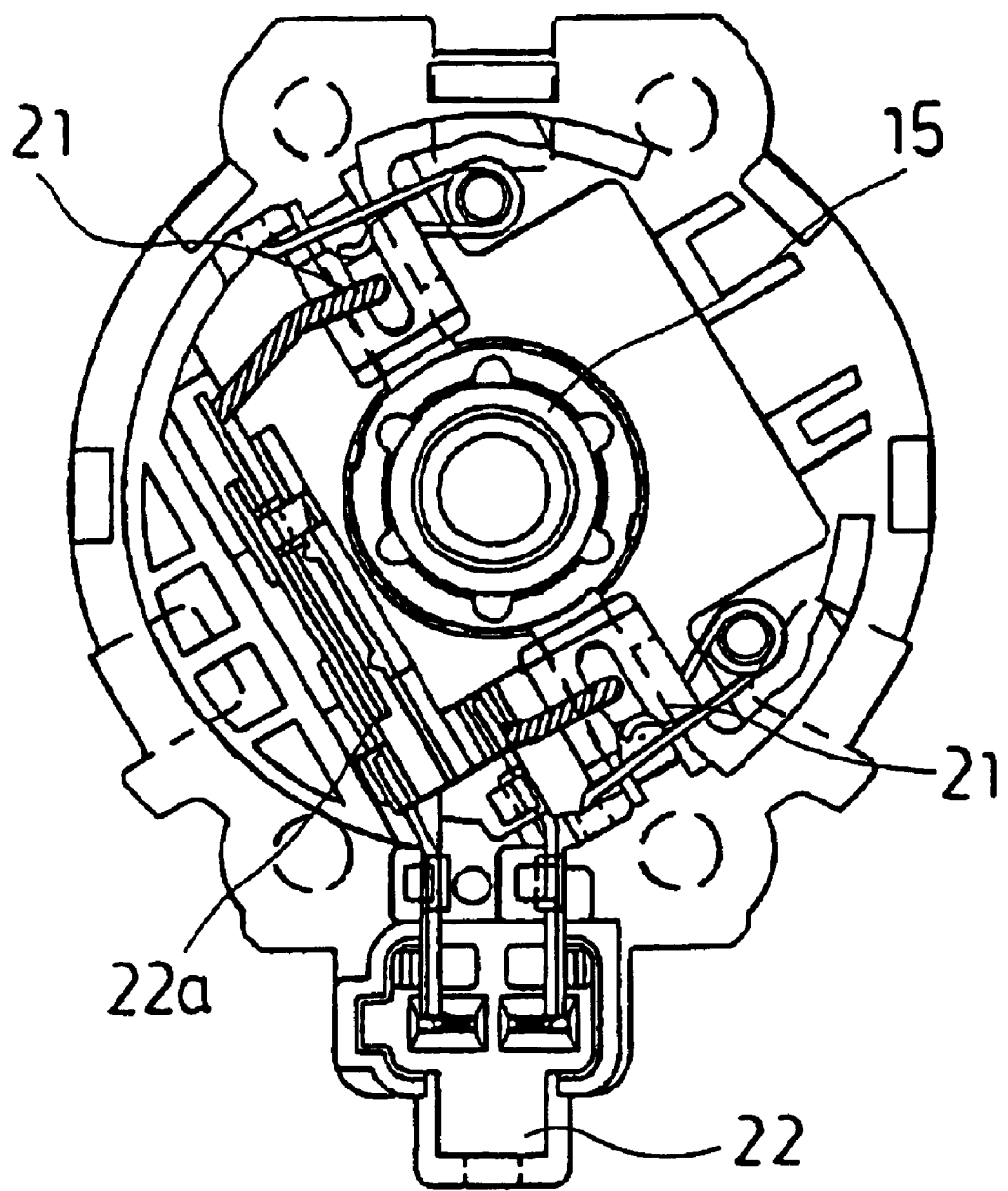
FIG. 3 is a view showing an end frame of the motor device of the first embodiment viewed from an armature side.
Figure 4:
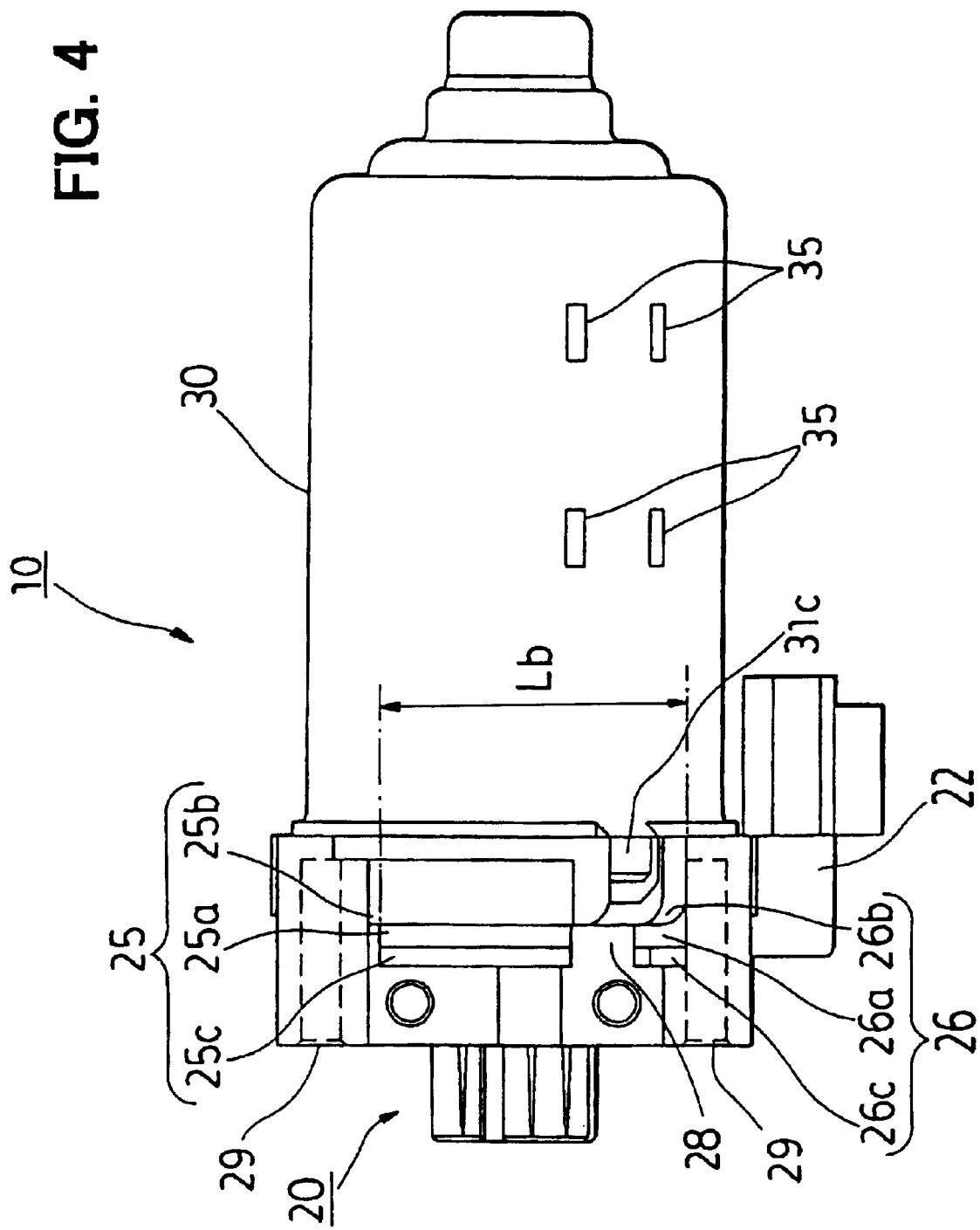
FIG. 4 is a front view of the motor device of the first embodiment.

As shown by FIG. 2 to FIG. 4, the end frame 20 is provided with a brush device 21, the bearing 15 and the like on one side thereof and formed with guide portions 25 and 26, crimping portions 27a through 27c at three locations engaged with claws 31a through 31c at three locations of the motor yoke 30 by crimping and an engaging hole 29 for engaging with a gear box (not illustrated) on other side thereof.

Further, a connector portion 22 for supplying power source is integrally molded with the end frame 20, formed on a side opposed to the crimping portion 27a by interposing the rotating shaft and extended to a side of the motor yoke.

The brush apparatus 21 includes brushes which are bought into sliding contact with the conmmutator 16, a brush box in a box shape for holding the brush slidably and a spring for urging the brush to a side of the commutator 16. The brush device 21 is arranged at two locations by interposing the rotating shaft. Further, a terminal attaching portion is attached with a terminal 22a and the brush and the terminal 22a are electrically connected by a pig tail. Further, a connection terminal is provided from the terminal 22a by way of the connector portion 22. Further, the bearing 15 (sliding bearing) is inserted and fixed by a washer.

The crimping portions 27b and 27c are formed at positions remote from the crimping portion 27a as a reference respectively by 120 degrees centering on the rotating shaft. The crimping portions 27a through 27c are grooves engaged with the claws 31a through 31c and formed substantially toward the rotating shaft.

The claws 31a through 31c at three locations of the motor yoke 30 are formed to extend to corresponding positions of the crimping portions 27a through 27c at three locations. Therefore, when the claws 31a through 31c at three locations arranged at the positions remote from each other respectively by 120 degrees, are crimped substantially toward directions of the center of the rotating shaft by a jig, crimping strength is dispersed uniformly in the peripheral direction of the motor yoke 30 and the end frame 20 and the motor yoke 30 are integrally coupled.

Guide portions 25 and 26 are constituted by guide grooves 25a and 26a, support portions 25b and 26b, and rocking restraining portions 25c and 26c. The guide portions 25 and 26 are formed respectively in parallel with directions substantially orthogonal to the rotating shaft and arranged symmetrically relative to a line connecting the rotating shaft and the crimping portion 27a. Further, the rocking restraining portions 25c and 26c are formed to expand in directions substantially orthogonal to a direction of the rotating shaft continuously from the guide grooves 25a and 26a.

The crimping portions 27b and 27c are arranged at respective 120 degrees centering on the rotating shaft with the crimping portion 27a as the reference and therefore disposed between the guide portions 25 and 26.

The jig for crimping is inserted from the direction of the rotating shaft and is brought into contact with the crimping portions 27a through 27c and crimps the claws 31b and 31c.

Therefore, there are formed inserting portions 28 for inserting the jig for crimping between the guide portions 25 and 26 to thereby separate the guide portions 25 and 26. As a result, the guide portion 26 is formed to be shorter than the guide portion 25 in a transfer direction.

Figure 6:
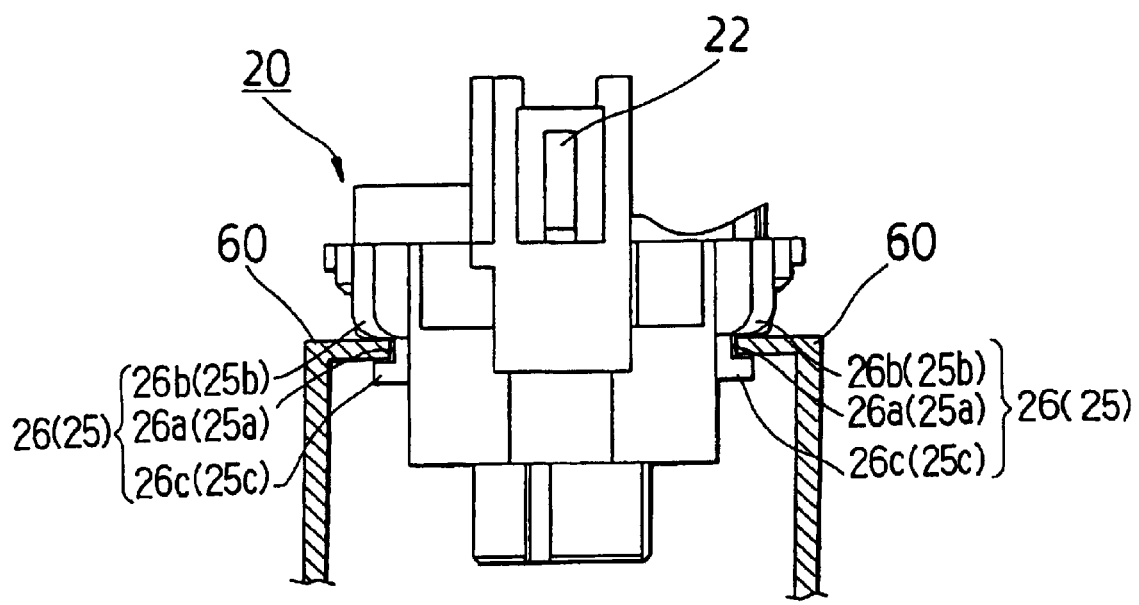
FIG. 6 is an explanatory view of a situation of installing the end frame of the motor device of the first embodiment on a transfer rail.

FIG. 6 shows a situation of arranging the end frame 20 at a transfer rail 60. The transfer rail 60 is engaged with the guide portions 25 and 26. The support portions 25b and 26b are brought into contact with the transfer rail 60, and the end frame 20 is slidably held by the transfer rail 60. The rocking restraining portions 25c and 26c are operated to restrain rocking in transferring the end frame 20 engaged with the transfer rail 60.

In an assembling line, when parts to be assembled are assembled to the end frame 20, it is likely that by assembling the parts to be assembled, weight balance of the end frame 20 in the transfer direction is lost. Hence, a length Lb from the outer side end portion of the guide portion 25 to the outer side end portion of the guide portion 26 is set to be large such that the end frame 20 can firmly be held on the transfer rail 60 even when the weight balance is lost.

In motor yoke assembling steps on the assembling line, the motor yoke 30 is fitted to the end frame 20 above the transfer rail 60, the two members are detached from the transfer rail 60 by a chuck for assembling while being held integrally, turned upside down and temporarily held by disposing the motor yoke 30 to a lower side. Further, a crimping jig is brought into contact with and simultaneously crimp the claws 31a through 31c.

Crimping strength of the motor yoke 30 can be made uniform in the peripheral direction by simultaneously crimping the claws 31a through 31c and the motor yoke 30 and the end frame 20 can be integrated while coinciding center axes of the motor yoke 30 and the end frame 20. At this occasion, the crimping jig is inserted into the inserting portions 28 from above and brought into contact with the claws 31b and 31c.

Figure 5:
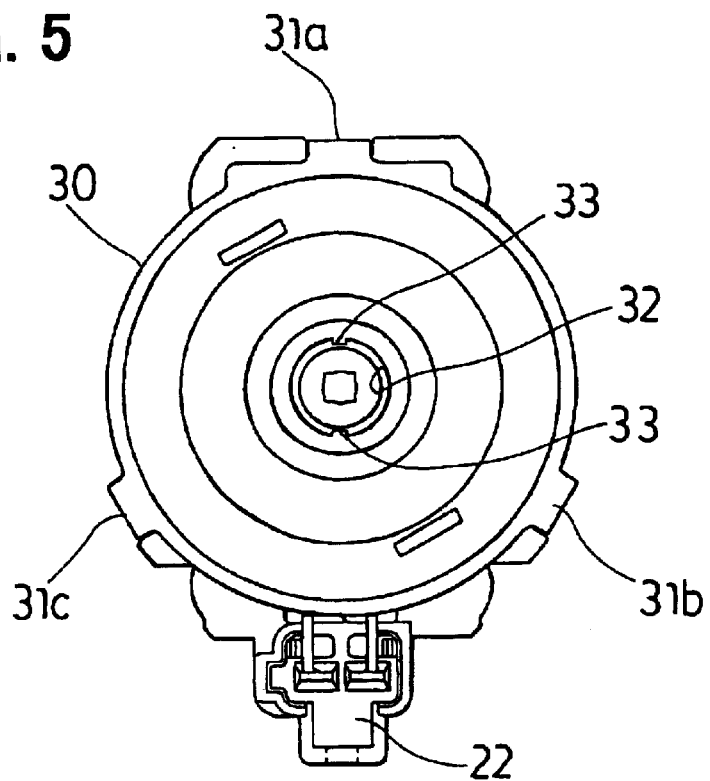
FIG. 5 is a right side view of the motor device of the first embodiment.

The motor yoke 30 is a part made of a metal in a cylindrical shape and a side thereof to be engaged with the end frame 20, is opened and extended with the claws 31a through 31c in the direction of the rotating shaft. Meanwhile, a bearing holding portion 34 is formed to project on a side opposed to the side to be engaged with the end frame 20 and an opening portion 32 is formed at an end portion thereof. The opening portion 32 is formed with projections 33 at two locations from an edge portion thereof toward directions of the center of the shaft. The projections 33 are arranged at symmetrical positions relative to the rotating shaft of the opening portion 32 as shown by FIG. 1 and FIG. 5.

Further, the magnet 11 is formed in a plate-like shape having a curved face to be brought into close contact with the inner peripheral face of the motor yoke 30. Two sheets of the magnets 11 are inserted into the motor yoke 30 and arranged by interposing engaging recessed portions 35. Further, end faces of the magnets 11 on one side are respectively engaged with the engaging recessed portion 35 and end faces of two sheets of the magnets 11 on other side are simultaneously pressed to expand to opposed sides in the diameter direction by a fixed spring to thereby brought into close contact with the inner peripheral face of the motor yoke 30.

There are formed square connection holes 13a for engaging with front end portions 85a of cable wires 85 on both end sides of the shaft 13 and the connection hole 13a is inserted with the cable wire 85 to be rotatable integrally therewith. FIG. 7C shows a situation of connecting a hose 80 for holding the cable wire to the opening portion 32. As described above, the opening portion 32 is formed with the projections 33, and therefore the cable wire holding hose 80 can directly be connected to the motor yoke 30 without interposing a cap (not illustrated) of the opening portion 32.

Figure 7A:
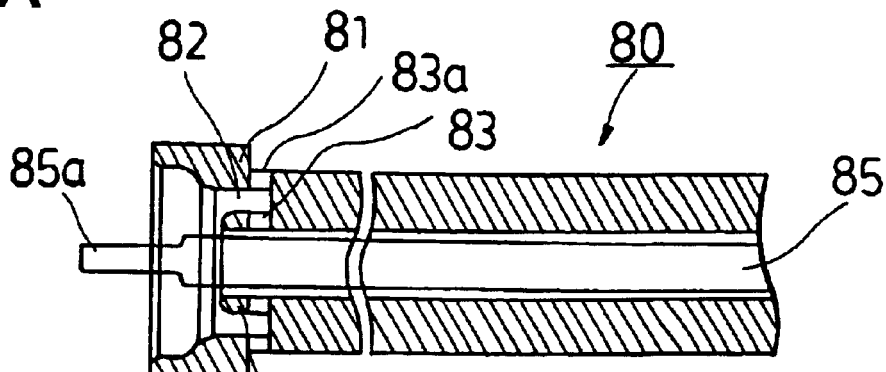
FIGS. 7A through 7C are explanatory views of a situation of coupling a hose for holding a cable wire and a motor yoke of the motor device of the first embodiment.
Figure 7B:
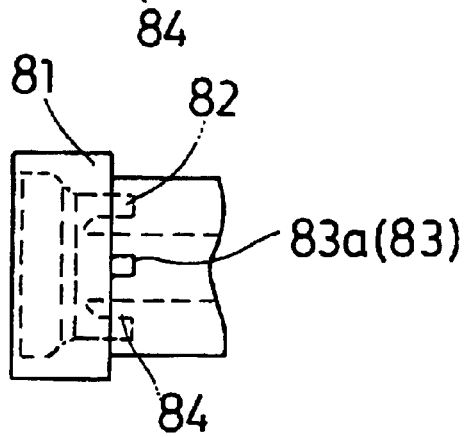
Figure 7C:
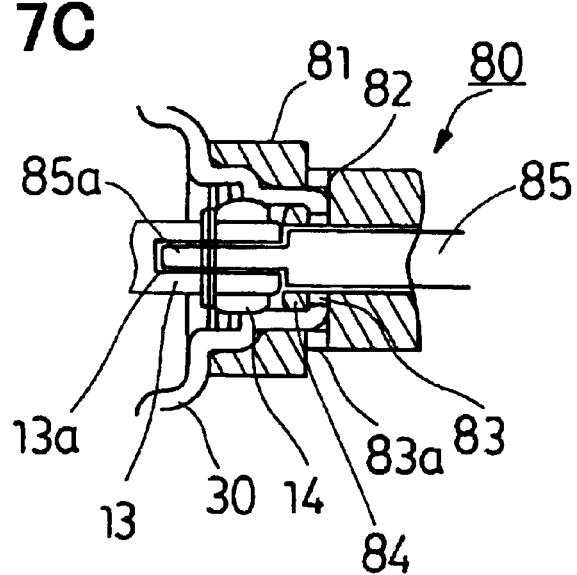

As shown by FIG. 7A and FIG. 7B, an inner portion of a front end portion of the cable wire holding hose 80 is formed with a projected portion 84 in a shape of a circular ring and an outer side of the projected portion 84 is formed with an air gap portion 82 similarly in a shape of a circular ring. Further, a side face of the projected portion 84 is formed with recessed portions 83 at two locations and an outer side face of the front end portion of the cable wire holding hose 80 is opened with a positioning window 83a at a position in correspondence with the recessed portion 83.

Further, a shape of an inner side wall of a connecting portion 81 substantially coincides with a shape of an outer side of the projected portion on the side of the opening portion 32 of the motor yoke 30, when the connecting portion 81 is connected to the motor yoke 30. A portion of the outer side face of the projected portion is brought into contact with the inner side wall of the connecting portion 81 and therefore. The motor yoke 30 and the cable wire holding hose 80 can firmly be fixed.

Therefore, when the positioning window 83a is matched to an extended position of the projection 33 of the motor yoke 30 in the direction of the rotating shaft, the shaft 13 is adjusted to rotate such that the connection hole 13a of the shaft 13 is engaged with the front end portion 85a in the square shape of the cable wire 85, and the connecting portion 81 of the cable wire holding hose 80 is pressed to the side of the motor yoke 30, the shaft 13 and the cable wire 85 are connected, the front end portion of the motor yoke 30 is fitted to the air gap portion 82, the projection 33 is engaged with the recessed portion 83 and the cable wire holding hose 80 and the motor yoke 30 are connected.

By engaging the projection 33 and the recessed portion 83, the cable wire holding hose 80 is held without being rotated relative to the motor yoke 30. However, the projection 33 may be provided not at two locations but three or more locations and the recessed portion 83 may be formed at a position in correspondence with the projection 33.

Next, an explanation of a method of manufacturing the end frame 20 will be given. The end frame 20 is molded by injection molding by a predetermined molding condition by using a mold 90 shown in FIG. 8.

Figure 8:
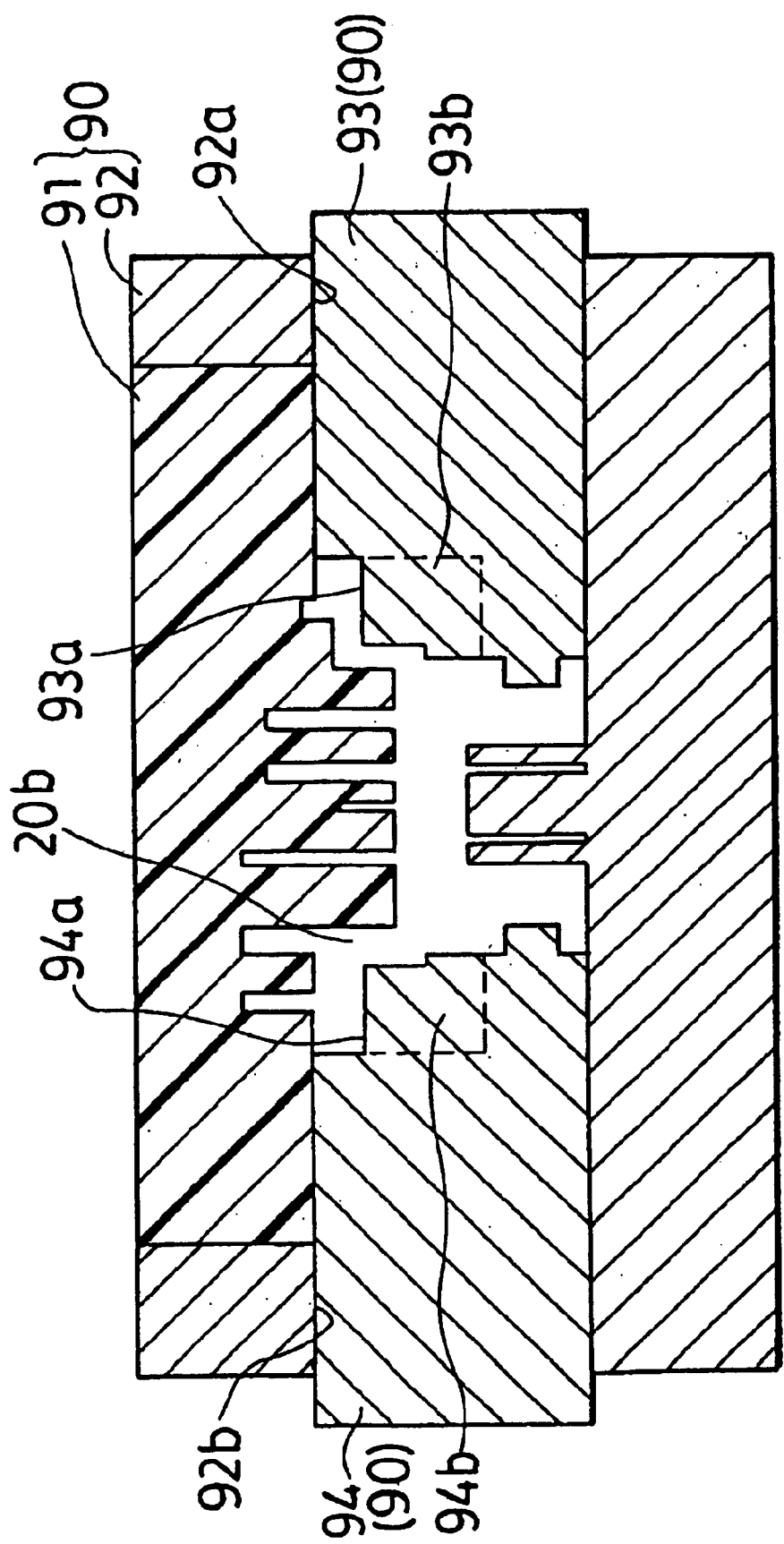
FIG. 8 is a sectional view of a mold for manufacturing the end frame of the motor device of the first embodiment.

FIG. 8 shows a sectional view of a mold 90 of the end frame 20 in correspondence with a section of FIG. 2 taken along a line VIII—VIII. Here, the top side of the paper face is the side of the motor yoke 30. The mold 90 is provided with a core 91, a cavity 92, and slide molds 93 and 94. Further, the cavity 92 is formed with inserting holes 92a and 92b for respectively inserting the slide molds 93 and 94.

However, for simplifying the explanation, there are omitted a slide mold for forming the brush box in the box-like shape and an undercut portion of the connector portion 22.

The slide molds 93 and 94 specify faces on both sides of a line connecting the rotating shaft and the connector portion 22 and a face among the engaging holes 29 in the end frame 20. That is, the slide molds 93 and 94 specify the guide portions 25 and 26, the inserting portions 28, the crimping portions 27b and 27c and the like.

Meanwhile, the core 91 and the cavity 92 specify other portions which are not specified by the slide molds 92 and 93, that is, the connector portion 22, the portion for inserting the shaft 13, the terminal attaching portion, the crimping portion 27 and the like.

The slide molds 93 and 94 specify the inserting portions 28 by inserting portion forming positions 93b and 94b. Further, crimping portion forming portions 93a and 94a of the inserting portion forming portions 93b and 94b, respectively specify the crimping portions 27b and 27c.

In order to mold the end frame 20, first, as shown by FIG. 8, there is set the mold 90 constituted by the core 91 and the cavity 92. The slide molds 93 and 94 are inserted into the inserting holes 92a and 92b. Thereby, there is formed a cavity 20b that defines the end frame 20 for molding purposes. Further, a resin material is filled in the cavity 20b by way of a runner and a gate, not illustrated.

Further, after the resin material filled in the cavity 20b has been solidified, by removing the above-described resin material from the mold 90, the end frame 20 can integrally be molded.

Next, and explanation of a method of manufacturing the motor yoke 30 will be given. First, as a base portion of assembling the motor 10, the end frame 20 is mounted on the transfer line by directing a side thereof to be engaged with the motor yoke 30 upwardly and engaging the transfer rail 60 and the guide portions 25 and 26.

At the transfer line, assembled parts or semi-assembled parts are manufactured. The assembled parts or the semi-assembled parts are successively assembled to the end frame 20 constituting the base part by assembling robots at respective assembling steps. The end frame 20 assembled with the assembled parts or the semi-assembled parts is transferred to a successive step respectively in a lot of several pieces thereof by a gripper along the transfer rail 60.

In this way, the end frame 20 is assembled with all of the necessary assembled parts or the semi-assembled parts to thereby finish the motor 10.

The end frame 20 is mounted on the transfer rail 60, thereafter, assembled with the bearing 15, a washer, the brush, the terminal member and the like, and transferred to an armature assembling step. Further, at the armature assembling step, the armature 12 is inserted into the end frame 20.

Next, at a motor yoke assembling step, the end frame 20 subjected to the armature integrating step is covered with the motor yoke 30 in which the axis center direction of the bearing 14 (sliding bearing) has previously been adjusted. The claws 31a through 31c of the motor yoke 30 are crimped by the crimping jig as described above to thereby integrally couple the end frame 20 and the motor yoke 30.

Although there is shown an example of assembling the motor 10 by an automatic assembling line, similar to the automatic assembling line, even by a manual assembling line, it is possible to move to slide the end frame 20 by engaging with the transfer rail 60. It is also possible to transfer the end frame 20 between steps.

As described above, according to the embodiment, the following effects are achieved.

(1) The end frame 20 is formed with the crimping portions 27a through 27c engaged with the claws 31a through 31c of the motor yoke 30 at every 120 degrees centering on the rotating shaft. Therefore, when the claws 31a through 31c are crimped to thereby integrally fix the end frame 20 and the motor yoke 30, the crimping strength can be dispersed uniformly in the peripheral direction of the rotating shaft.

(2) Further, although the crimping portions 27a through 27c at three locations are formed at every 120 degrees centering on the rotating shaft at an outer side portion of the end frame 20 in a substantially circular outer shape, the length Lb between the outer side two end portions of the guide portions 25 and 26 engaged with the transfer rail 60 can be made large.

(3) The motor 10 can be ensured with a stable assembling orientation in the respective assembling steps and transfer procedures in the respective steps since the guide portions 25 and 26 having the large length Lb are held by the transfer rail 60.

(4) It is preferable that the connector portion 22 can be formed at the position opposed to the crimping portion 27a by interposing the rotating shaft and between the crimping portions 27b and 27c, and therefore can be constituted symmetrically in the left and right direction.

(5) Although the guide portions 25 and 26 are constituted to be separated by the inserting portions 28 and the crimping portion 27a through 27c are arranged at every 120 degrees centering on the rotating shaft, a height of the end frame 20 in the direction of the rotating shaft is not influenced thereby. Therefore, a length of the motor 10 in the direction of the rotating shaft can be made substantially the same degree.

(6) Since the projections 33 are formed at two locations of the opening portion 32 of the motor yoke 30, the motor yoke 30 can directly be coupled to the cable wire holding hose having the connecting portion 81 having the recessed portion 83 engaged with the projections 33. Therefore, a number of pieces of parts can be reduced.

Further, the first embodiment of the invention may be changed as follows.

Figure 9:
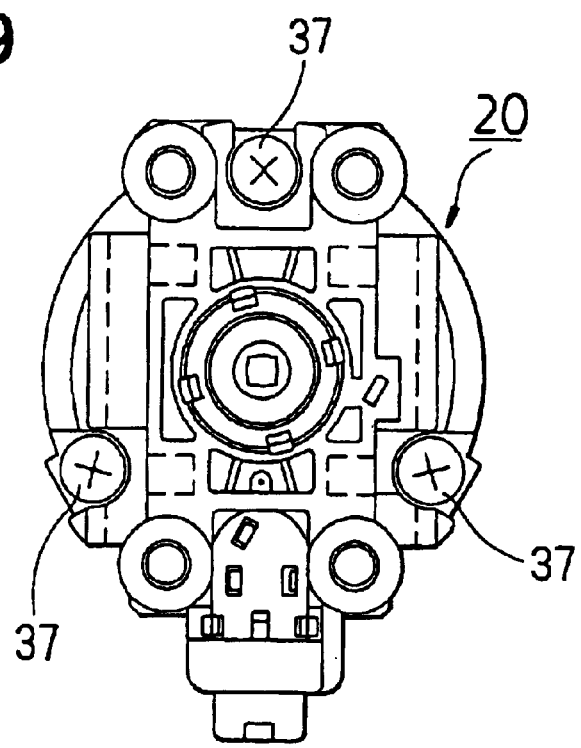
FIG. 9 is a left side view of a modified example of the motor device of the first embodiment.
Figure 10:
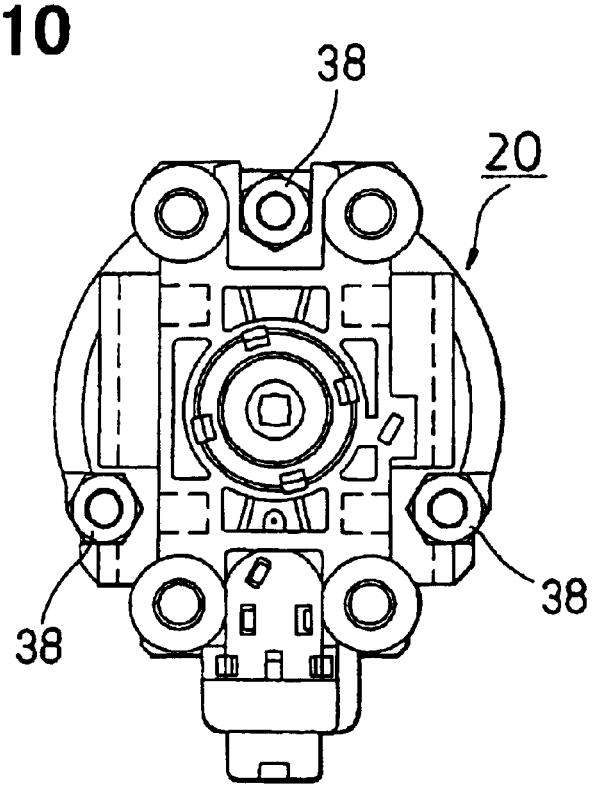
FIG. 10 is a left side view of other modified example of the motor device of the first embodiment.

As shown by FIGS. 9 and 10, each of the end frame 20 and the motor yoke 30 may be provided with engaging holes at three locations and the end frame 20 and the motor yoke 30 may be screwed by screws 37 or nuts 38. In this case, a flange portion may be extended from an end portion of the motor yoke 30 on a side for engaging with the end frame 20 to an outer side in the diameter direction and the flange portion may be provided with engaging holes at three locations. Therefore, the motor yoke 30 having a diameter smaller than that of the motor yoke 30 of the actual motor 10 shown in FIG. 1 and having the flange portion and the end frame 20 may be assembled.

Further, the crimping portion 27a and the connector portion 22 can also be formed contiguously to each other.

Further, when outer side end faces of the support portions 25b and 26b are formed in a circular arc shape, areas of bringing the support portion 25b and 26b into contact with the transfer rail 60 are reduced by being proximate to the crimping portion 27a. However, the support portions 25b and 26b may be of a mode expanded to further outer sides. Stability of holding the end frame 20 by the transfer rail 60 is preferably promoted.

The projections 33 may be provided at three or more locations so far as the cable wire holding hose 80 is provided with the recessed portions 83 in correspondence with the projections 33.

The motor 10 may be used in a motor integrally formed with a speed reducing portion containing a worm shaft and a wheel gear in mesh with the worm shaft at the end frame 20, for example, a wiper motor, a power window motor, a sun roof motor or the like.

(Second Embodiment)

Figure 11:
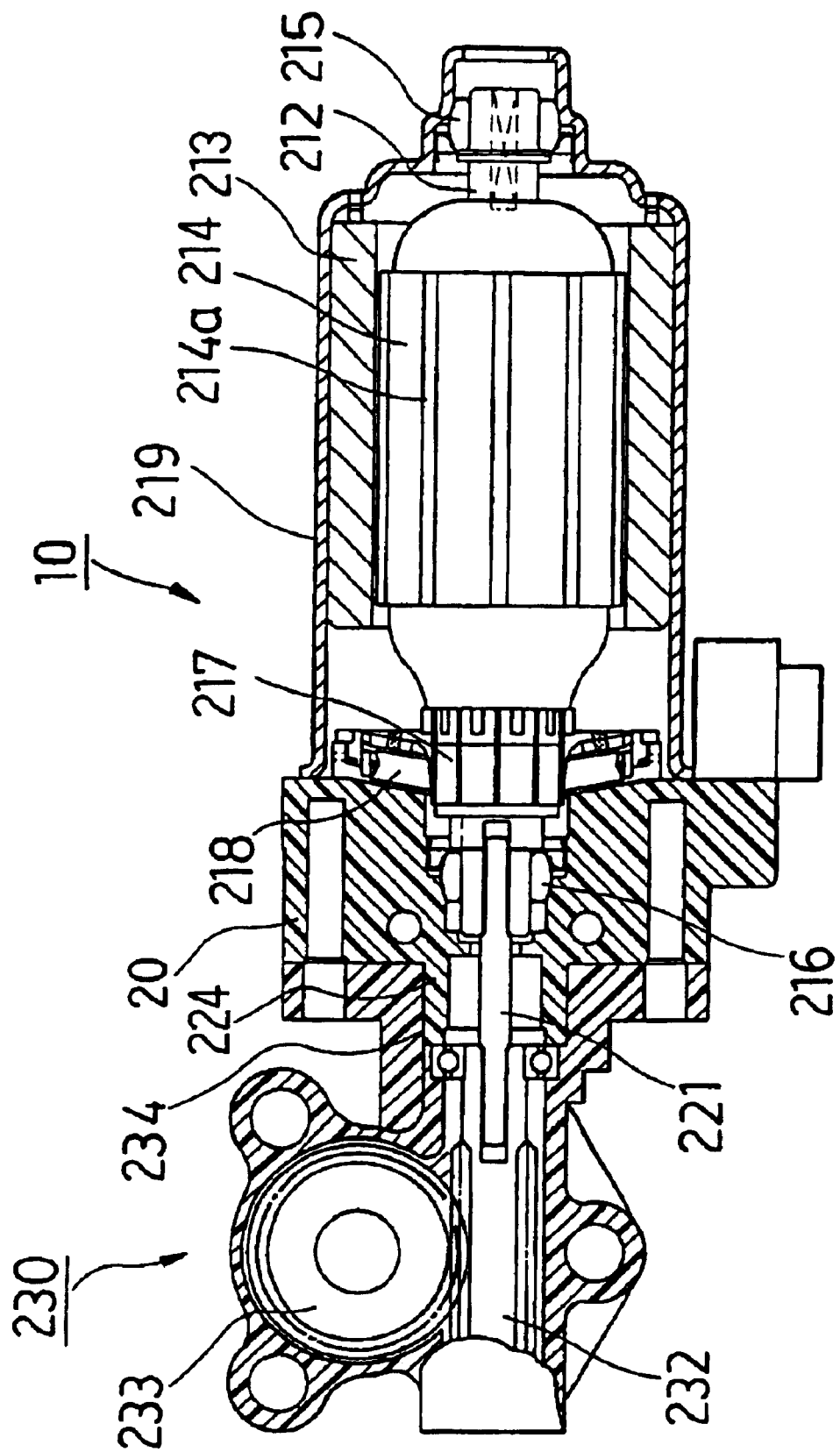
FIG. 11 is a sectional view of a motor device of a second embodiment of the invention.

As shown by FIG. 11, a motor device is constituted by a motor 10 and a gear box 230. The motor 10 is provided with a stator 213, a rotor 214 having a winding 214a, a shaft 212 of the rotor 214, bearing portions 215 and 216 axially supporting the shaft 212, and a commutator 217 arranged on one end side of the shaft 212 and is contained inside of the end frame 20 made of resin and a yoke 219 made of metal.

An end frame 20 is provided with brush devices 218 which are brought into sliding contact with the commutator 217, a connector portion for supplying power source and the like on one side thereof and an engaging portion 224 for directly fitting to the gear box 230 and the like on other side thereof and is a resin-made part integrally form therewith.

The gear box 230 is constituted by a worm 232 rotatably held at inside of the end frame 20 made of resin and a worm wheel 233 in mesh with the worm 232. Rotation of the shaft 212 is transmitted to the worm 232 via a cable 221 engaged with the shaft 212 and the worm 232. Further, the rotation is transmitted from the worm 232 to the worm wheel 233. Further, there is constructed a construction in which by rotating the worm wheel 233, the rotation is transmitted to an output shaft insertingly fitted to the worm wheel 233.

In engaging the motor 10 and the shaft 212, the cable 221 is not necessarily interposed but the shaft 212 may be directly engaged with the worm 232 by being extended to the worm 232.

According to the end frame 20 and the gear box 230, the engaging portion 224 of the end frame 20 is fitted into an engaging portion 234 of the gear box 230 and under the state, the end frame 20 and the gear box 230 are fixed and integrated further by a screw.

Figure 12:
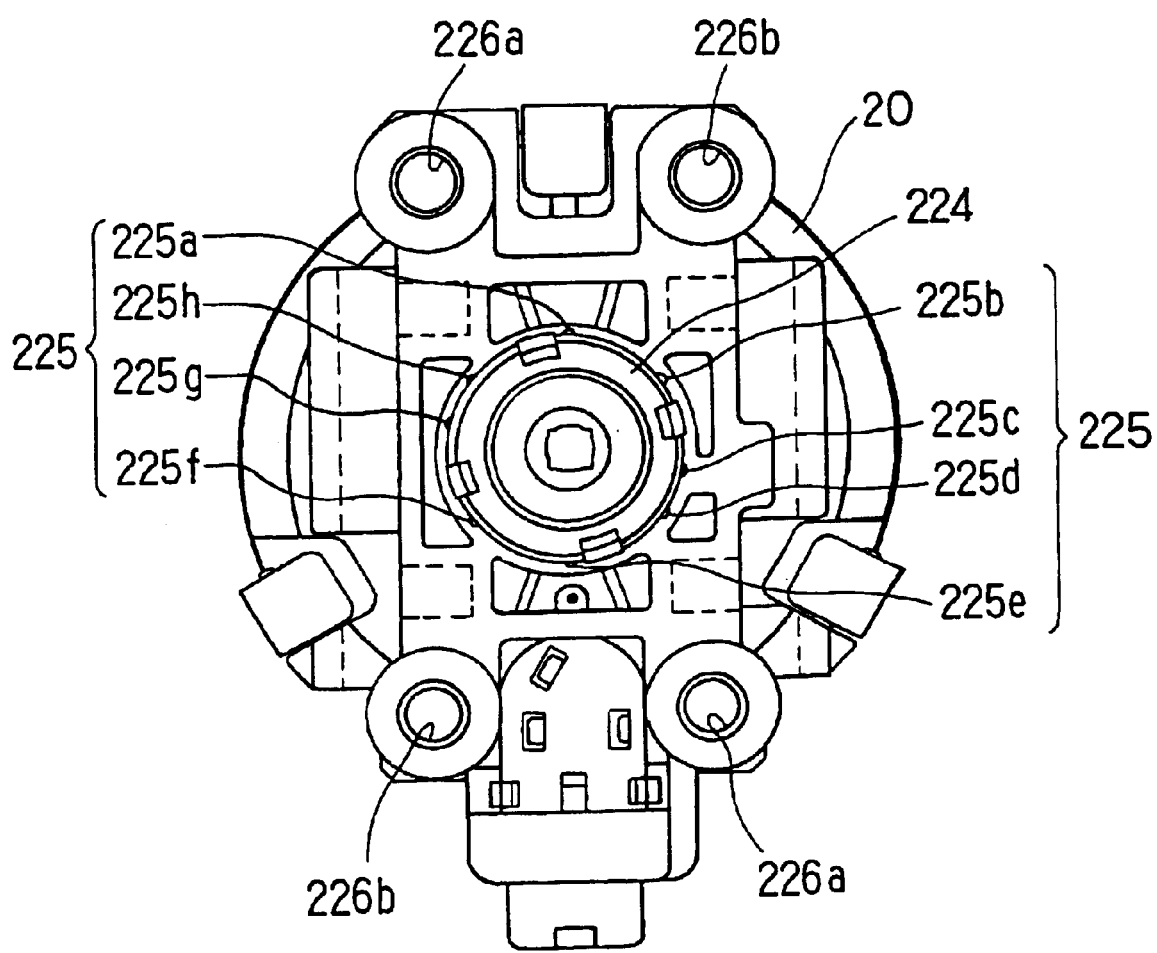
FIG. 12 is a front view of an end frame of the motor device of the second embodiment.
Figure 13:
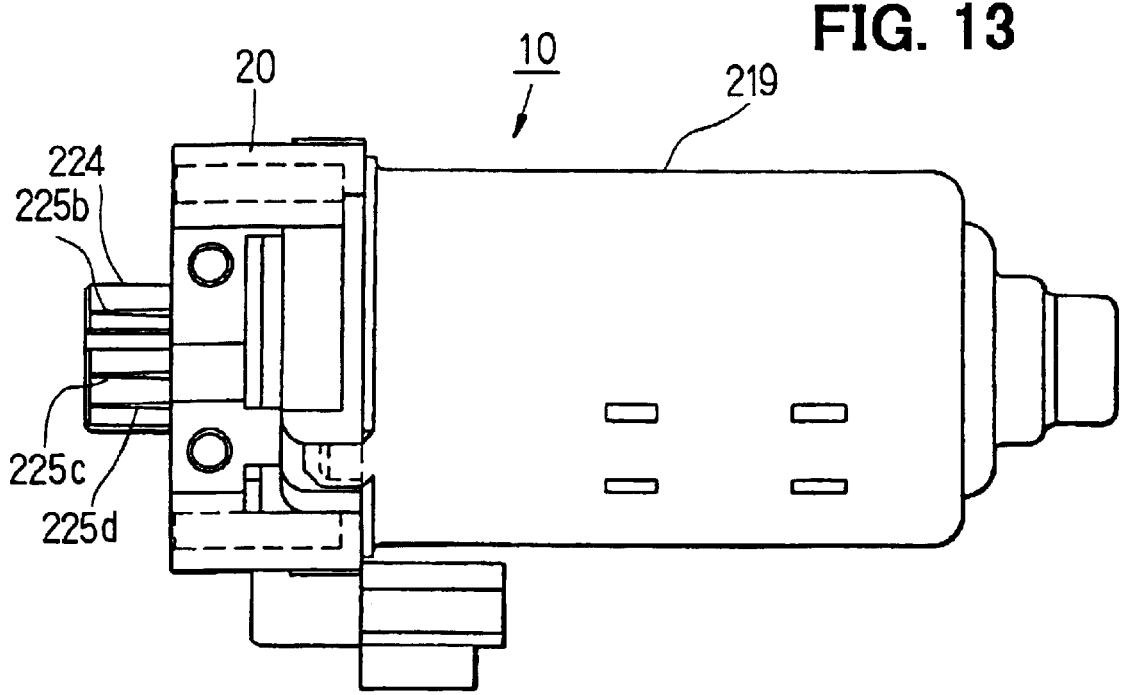
FIG. 13 is a side view of a motor device of the second embodiment.

FIG. 12 and FIG. 13 show a front view and a side view of the motor 10. The end frame 20 is arranged with two pairs of screw holes 226a and 226b at symmetrical positions interposing the engaging portion 224.

In order to fix the gear box 230 to the end frame 20, the gear box 230 and the end frame 20 are screwed by two pieces of screws by using either of the pair of the screw holes 226a or 226b. Therefore, the gear box 230 can be fixed to the end frame 20 in four ways of angles. As a result, the mountability to a power seat device (not illustrated) is preferably improved.

Further, a plurality of projected portions 225 are formed at an outer peripheral face of the engaging portion 224 from a bottom portion to a free end side of the outer peripheral face along the direction of the rotating shaft. The projected portions 225 comprise projected portions 225a through 225h at eight locations and are brought into contact with an inner peripheral face of the engaging portion 234 when the engaging portion 224 is fitted to the engaging portion 234 of the gear box 230.

In order to make the engaging portion 224 and the engaging portion 234 easy to fit, the projected portion 225 is formed in a taper shape in which a width thereof in a peripheral direction is narrowed and a height thereof in a diameter direction is lowered toward the free end side of the engaging portion 224. However, the projected portion 225 may not be formed necessarily in a taper shape but may be formed to provide a constant width in the peripheral direction and a constant height in a diameter direction. Further, the projected portions 225 at eight locations may be constituted by a combination of those having a taper shape and those having other shape.

Further, the length of the projected portion 225 in the direction of the rotating shaft is not necessarily needed to be equal to the length from the bottom portion to the free end portion of the outer peripheral face of the engaging portion 224 but the projected portion 225 may be formed, for example, up to a position of about two thirds of the length from the bottom portion to the free end side.

In FIG. 12, according to the projected portions 225, the projected portions 225b, 225c and 225h are respectively arranged at a position rotated by 52 degrees, and a position rotated by 104 degrees in the clockwise direction and a position rotated by 52 degrees in the counterclockwise direction from the projected portion 225a as a reference. Further, the projected portions 225f, 225g and 225d are arranged respectively at positions symmetrical thereto relative to the rotating shaft. Here, the projected portions 225 at eight locations are arranged asymmetrically in the left and right direction with the projected portions 225a as the reference.

Figure 14:
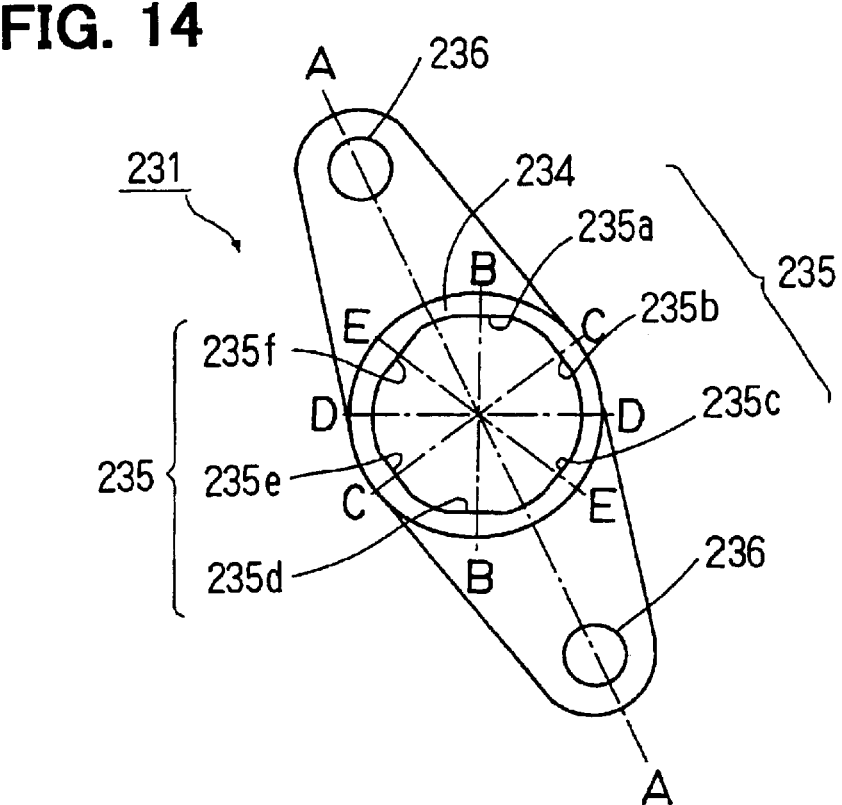
FIG. 14 is an explanatory view of a connecting portion of a gear box of the second embodiment.

FIG. 14 shows a coupling portion 231 of the gear box 230 coupled to the end frame 20 viewed from the side of the motor 10. A pair of screw holes 236 are inserted by screws integrally with the screw holes 226a or 226b of the end frame 20. The engaging portion 234 is provided with a plurality of plane portions 235 at an inner peripheral face thereof.

The plane portions 235 are constituted by plane portions 235a through 235f. The plane portions 235a and 235d are provided by constituting centers thereof by a line B—B rotated by 26 degrees in the clockwise direction from a line A—A as a reference. Further, the plane portions 235b and 235e are provided by constituting centers thereof by a line C—C rotated by 52 degrees in the clockwise direction therefrom. Further, the plane portions 235c and 235f are provided by constituting centers thereof by a line E—E rotated therefrom by 26 degrees in the counterclockwise direction. Further, also the plane portions 225 at six locations are arranged asymmetrically relative to the line A—A as the reference.

Figure 15A:
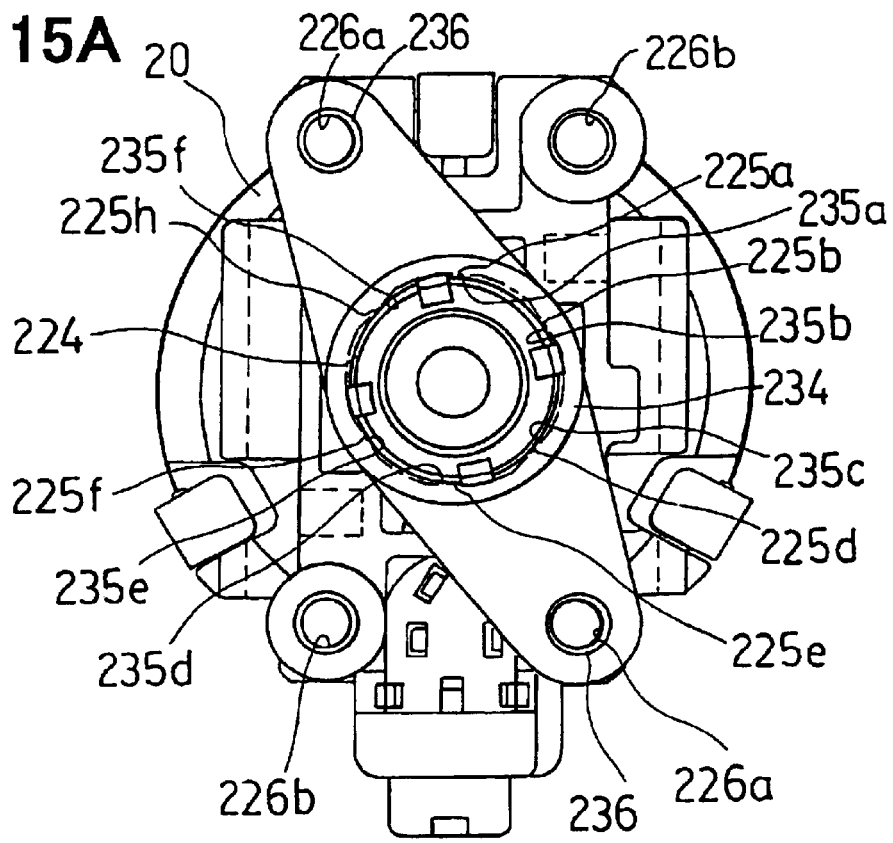
FIGS. 15A and 15B are explanatory views when the connecting portion of the gear box is fitted to an end frame.
Figure 15B:
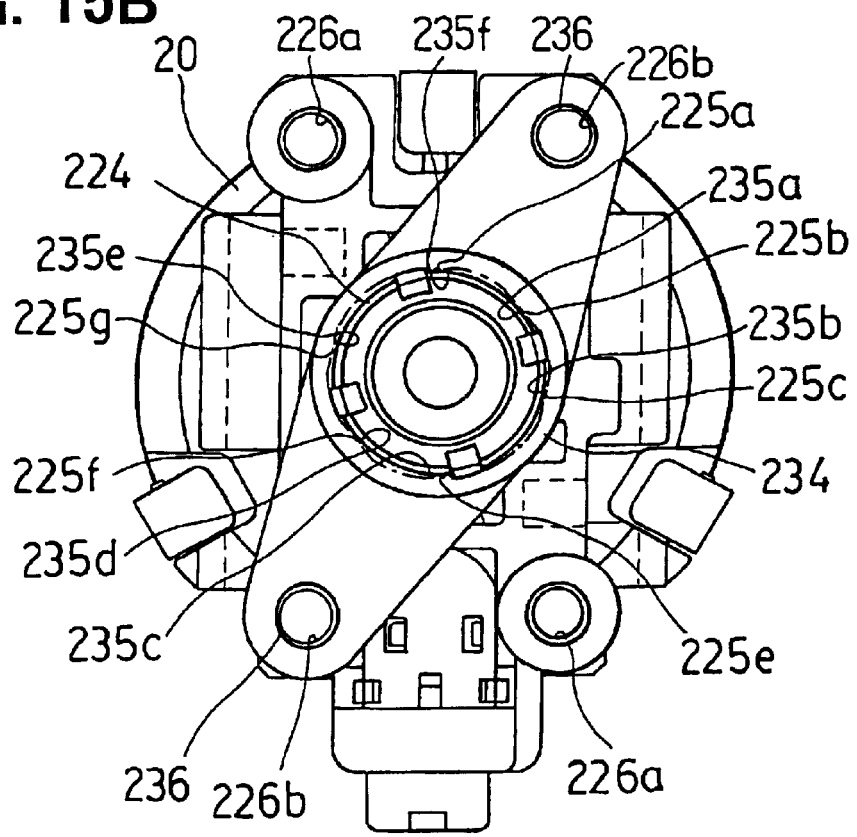

FIGS. 15A and 15B show states of fitting the coupling portion 231 to the end frame 20. FIG. 15A shows a case of using the screw holes 226a of the end frame 20 and FIG. 15B shows a case of using the screw holes 226b thereof.

In FIG. 15A, in the projected portions 225 at eight locations, the projected portions 225 which are brought into contact with the plane portions 235 are the projected portions 225a, 225b, 225d, 225e, 225f and 225h at six locations other than the projected portions 225c and 225g. Further, in FIG. 15B, the projected portions 225 at six locations other than the projected portions 225d and 225h are similarly brought into contact with the plane portions 235.

The projected portions 225 on the side of the end frame 20 and the plane portions 235 on the side of the gear box 230 are arranged as described above, and therefore in both cases of FIGS. 15A and 15B, the plane portions 235 and the projected portions 225 at six locations are brought into contact with each other. Further, with regard to a positional relationship in integrating the end frame 20 and the gear box 230, the end frame 20 and the gear box 230 can be integrated at positions opposed to positions in FIGS. 15A and 15B by 180 degrees relative to the rotating shaft.

Both of the end frame 20 and the gear box 230 are made of resin. Therefore, when the engaging portion 224 is inserted into the engaging portion 234, an adjustment is needed for accurately aligning axis centers of the shaft 212 of the motor 10 and the worm 232 of the gear box 230. However, with regard to the adjusting operation in which time and lever has been taken in the related art, the adjustment can easily be carried out preferably by adjusting a height of the projected portion 225 in the diameter direction by adjusting only a portion of a forming mold for specifying the portion of the projected portion 225 or cutting only a portion thereof for specifying the plane portion 235.

Although according to the above embodiment, there is shown a case of forming the projected portions 225 at eight locations in the engaging portion 224 and the plane portions 235 at six locations in the engaging portion 234, an angle of integrating the end frame 20 and the gear box 230 can be selected also by forming the two members as explained below.

Figure 16A:
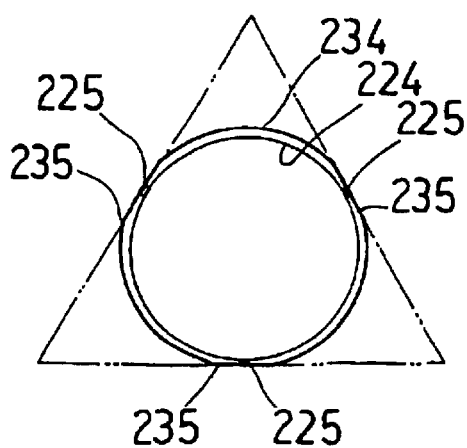
FIGS. 16A through 16E are explanatory views of a situation of fitting the end frame and the gear box.
Figure 16B:
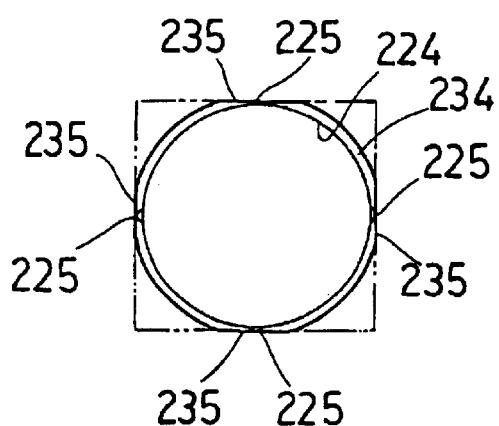
Figure 16C:
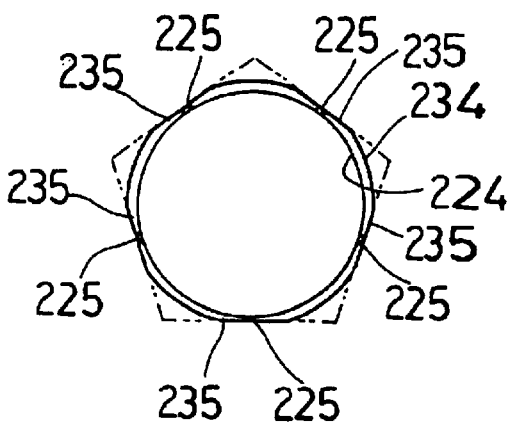
Figure 16D:
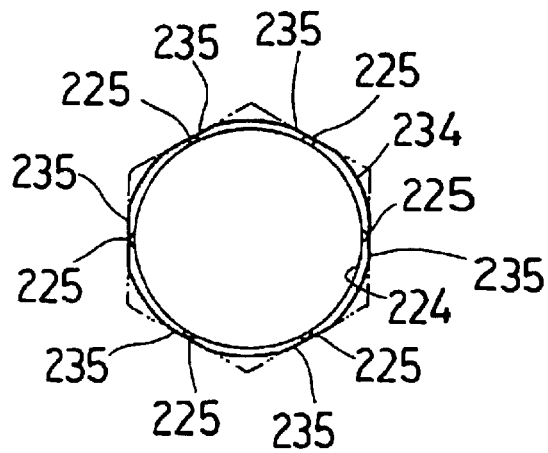
Figure 16E:
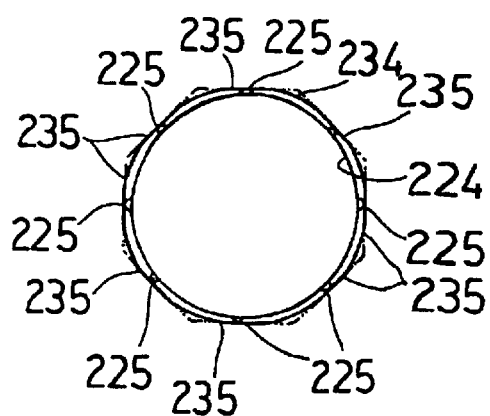

FIG. 16A is an explanatory view of a situation, in which the projected portions 225 at three locations are arranged on the outer peripheral face of the engaging portion 224 at every 120 degrees and a section of the inner peripheral face of the engaging portion 234 at a face orthogonal to the rotating shaft is formed to provide linear portions which are brought into contact with the projected portions 225 at three locations. In this case, the gear box 230 can select the integrating angle at every 120 degrees relative to the end frame 20.

Further, FIGS. 16B, 16C, 16D and 16E show cases of providing the projected portions 225 at the outer peripheral face of the engaging portion 224 respectively at every 90 degrees, at every 72 degrees, at every 60 degrees and at every 45 degrees. A section of the inner peripheral face of the engaging portion 234 at a face thereof orthogonal to the rotating shaft is formed to provide linear portions which are respectively brought into contact with the projected portions 225.

Therefore, in FIGS. 16B, 16C, 16D and 16E, relative positions of integrating the end frame 20 and the gear box 230 can preferably be selected at every 90 degrees, at every 72 degrees, at every 60 degrees and at every 45 degrees. The above is an example of arranging n pieces of the projected portions 225 at every angle represented by 360 degrees/n, where n is set to 3, 4, 5, 6 and 8. Further, n can also be set to 9 and 10.

Further, when screw holes are provided at the end frame 20 in accordance with a plurality of angular positions of integrating to the gear box 230 as described above, in accordance with a location of integrating the motor device, a positional relationship between the end frame 20 and the gear box 230 can be selected, and therefore parts can preferably be made common with those of other motor product. Further, the motor device is provided with a degree of freedom in an angle of a position of integrating the gear box 230 and the motor 10. Therefore, mountability to a power seat device is preferably excellent.

Figure 17:
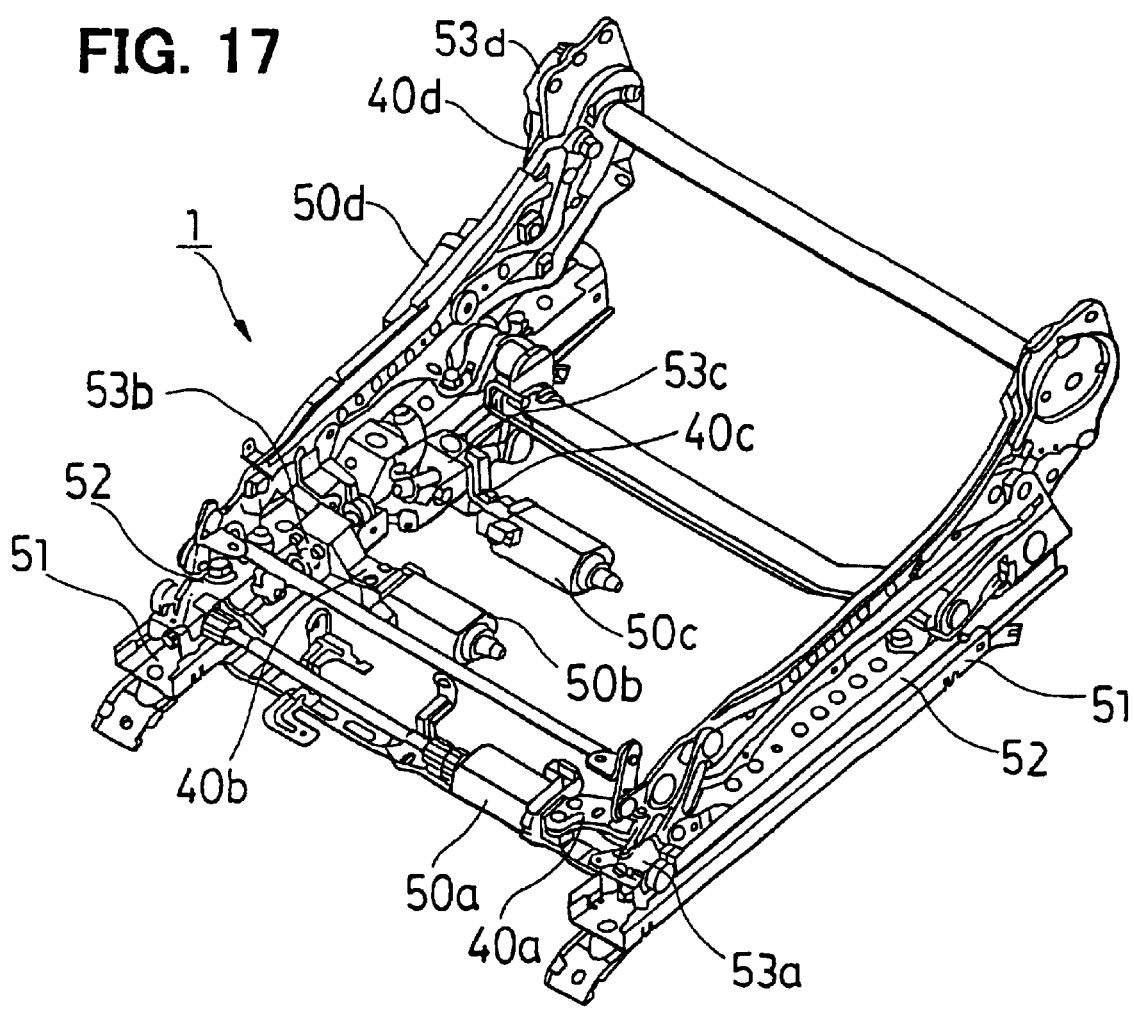
FIG. 17 is a perspective view of a power seat device.
Figure 18:
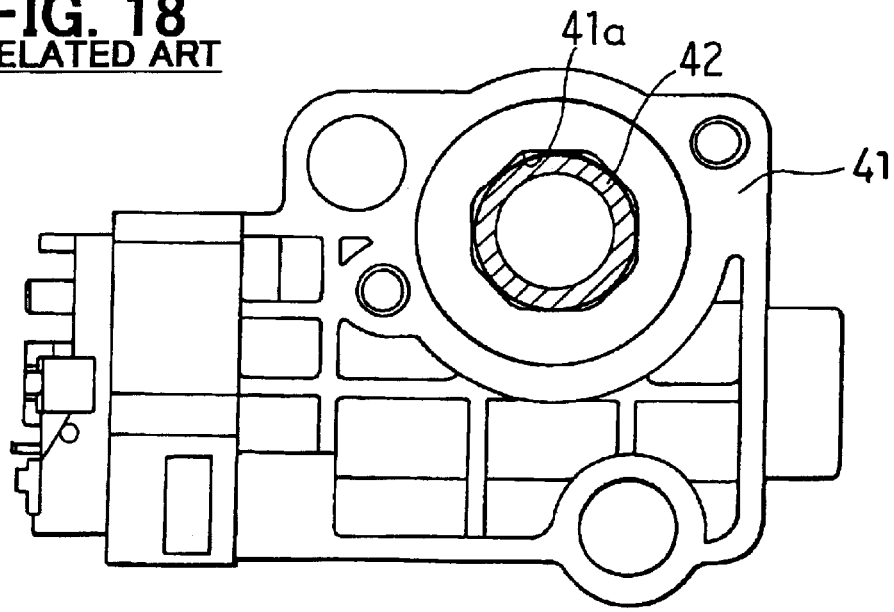
FIG. 18 is an explanatory view of a situation of fitting a resin-made end frame and a bearing metal in a related art.

The motor device can be used for a power seat device. Generally, as illustrated in FIG. 17, the power seat device 1 is provided with motors 50a through 50d constituting drive sources of respective seat position adjusting mechanisms, gear boxes 53a through 53d respectively in correspondence therewith and fixing brackets 40a through 40d. According to the power seat device 1, as the drive sources of operation of adjusting to slide a seat mounted at inside of a vehicle in a front and rear direction, operation of adjusting a front position and a rear position of the seat in an up and down direction and operation of adjusting to recline a seat back, the respectively exclusive motors 50a through 50d are used. The motors 50a through 50d are constituted by common parts to thereby achieve a reduction in cost.

According to the power seat device 1, an upper rail 52 attached with the seat is slidably mounted on a lower rail 51 fixed to the vehicle body side. The upper rail 52 is integrated with a seat slide mechanism, a mechanism of adjusting the front position and the rear position of the seat in the up and down direction and a reclining mechanism of the seat back other than the seat.

The seat slide mechanism is constituted by, for example, the sliding motor 50a, the gear box 53a, a screw rod, a fixing plate fixed to the lower rail 51 for rotatably supporting the screw rod and a nut portion screwed to the screw rod, and supported by the upper rail 52 as major portions thereof.

When the screw rod is rotated by operating the motor 50a via the gear box 53a, the nut screwed to the screw rod is moved forwardly and rearwardly along the screw rod in accordance with a rotation direction of the screw rod. A pair of the upper rails 52 arranged at left and right sides of the seat are fixed to each other by a support rod and moves the upper rail 52 and the seat by operation of moving the nut supported by the two upper rails forwardly and rearwardly.

Further, there can also be constructed a construction in which a rack is arranged at inside of the lower rail 51, an output shaft of the gear box 53a is provided with a pinion gear in mesh with the rack, and the pinion gear is rotated by operating the motor 50a to thereby adjust to slide the seat in the front and rear direction.

With regard to the mechanism of adjusting the front position and the rear position of the seat in the up and down direction and the reclining mechanism of the seat back, the front position and the rear position of the seat are made adjustable in the up and down direction and reclining of the seat back is made adjustable by respectively engaging the gear boxes 53b, 53c and 53d to the respective output shafts of the motor 50b for adjusting the front position in the up and down direction, the motor 50c for adjusting the rear position in the up and down direction and the reclining motor 50d, via respective link mechanisms from the respective gear boxes 53b, 53c and 53d.

However, in the above construction, when the power seat device 1 is integrated with the motor devices of a type of respectively directly connecting the resin-made end frames of the motors 50a through 50d and the resin-made gear boxes 53a though 53d, respective axis centers of the resin-made parts require adjustment. However, in adjusting the axis centers, depending on location, use or the like at inside of the power seat device 1 integrated therewith, operation of modification, adjustment of the like of molds for forming the fitting portion of the resin-made end frame and the gear box is obliged to carry out by gauging and parts cannot commonly be used to thereby cause an increase in production cost.

Therefore, the motors 50a through 50d are not directly connected to the gear boxes 53a through 53d respectively in correspondence therewith but fixedly connected thereto via the brackets 40a through 40d made of metal in the power seat device 1. Rotation of shafts of the motors 50a through 50d is transmitted to the respective gear boxes 53a through 53d via cables made of metal engaged with the shafts and outputted to sides of respective seat position adjusting mechanisms from the respective gear boxes 53a through 53d. The cables are provided with more or less flexibility. Therefore, even when the axis centers of the motors 50a through 50d and the gear boxes 53a through 53d are more or less deviated from each other, the deviation can be absorbed.

However, the motors 50a through 50d and the gear boxes 53a through 53d are coupled via the brackets 40a through 40d, and therefore a number of pieces of parts assembled to the power seat device 1 is increased, a number of assembling steps is also increased and weight of the power seat device 1 is increased.

Further, there also is the power seat device 1 of a type of integrally connecting directly a motor and a gear box.

However, since it is necessary to contain the motor 10 and the gear box in a limited space of the power seat device 1, separate parts are obliged to use for the gear boxes depending on locations of arranging the motors constituting drive sources in correspondence with respective operation, or left and right sides of arranging the power seat device 1 per se at inside of the vehicle.

However, when the motor device of the second embodiment is used, the problems can be resolved without using the fixing brackets 40a through 40d.

The power seat device according to the second embodiment achieves the following effects.

(1) When the end frame 20 and the gear box 230 commonly made of resin are fitted, the adjustment for aligning the axis centers of the motor 10 and the gear box 230 can easily be carried out by machining only a portion of forming the projected portion 225 or a portion of forming the plane portion 235 of molds for forming the respective engaging portions 224 and 234.

(2) The motor 10 and the gear box 230 can be connected without interposing a bracket, and therefore the bracket can be abolished and the motor 10 is preferably easy to be used commonly as a drive source of respective operation of the power seat device.

(3) The adjustment of the axis centers of the motor 10 and the gear box 230 is facilitated and generation of operating sound in operating the motor can be prevented.

(4) The angle of integrating the gear box 230 to the motor 10 is provided with the degree of freedom, and therefore the mountability of the motor device to the power seat device can be promoted.

(5) Even when the power seat device is arranged at inside of a vehicle, the motor device can commonly be used regardless of left or right side.

Further, the second embodiment may be changed as follows.

The recessed engaging portion 224 may be provided on the side of the end frame 20 and the projected engaging portion 234 may be provided on the side of the gear box 230. The linear portion may be provided at an outer side section in the direction orthogonal to the rotating shaft of the projected engaging portion 224 and an inner side section of the recessed engaging portion 234 in a direction orthogonal to the rotating shaft may be formed by a circular shape and the projected portion may be provided at an inner peripheral face thereof.

Further, the end frame 20 may be constructed by a construction having the guide portion (25, 26 of FIGS. 2, 4, 6) similar to the end frame of the first embodiment.

What is claimed is:

1. A motor device comprising:
a motor yoke having a cavity portion and accommodating therein an armature having a rotating shaft; and
an end frame for closing the cavity portion and formed with a fixed portion that is fixed to a fixing portion formed at the motor yoke,
wherein the end frame is formed with guide portions for slidably engaging an assembly line transfer rail, the guide portions being generally perpendicular to the rotating shaft, and
wherein at least one of the guide portions is formed with an inserting portion for inserting a fixing member for attachment of the fixing portion of the motor yoke and the fixed portion of the end frame.

2. The motor device according to claim 1, wherein the fixing portion of the motor yoke and the fixed portion of the end frame are formed at a plurality of locations in equal intervals in a peripheral direction centering on the rotating shaft.

3. The motor device according to claim 1, wherein the motor yoke is provided with a section substantially in a circular shape.

4. The motor device according to claim 1, wherein the guide portions are grooves formed in parallel with an engaging direction of the assembly line transfer rail.

5. The motor device according to claim 1, further comprising:
   a gear box made of a resin and directly connected to the end frame to receive a rotating force of the rotating shaft,
   wherein the end frame is made of a resin, includes a projected engaging portion at one of the end frame and the gear box, and includes a recessed engaging portion for engagement with the projected engaging portion at the other thereof, and
   wherein the projected engaging portion includes a plurality of projections along a direction of the rotating shaft at a face thereof for engagement with the recessed engaging portion, and the recessed engaging portion includes a plurality of plane portions in contact with the plurality of projections.

6. The motor device according to claim 5, wherein the end frame and the gear box are connectable at a plurality of coupling portions capable of being coupled at a selective position centering on the engaging portions.

7. The motor device according to claim 1, wherein the inserting portion is located between the guide portions in a direction of the transfer rail.

8. The motor device according to claim 1, wherein one of the guide portions is shorter than another of the guide portions in an assembly line transfer rail engagement direction.

9. A motor device comprising:
   a motor yoke accommodating therein an armature having a rotating shaft; and
   an end frame disposed adjacent to the motor yoke and accommodating an axial end of the rotating shaft,
   wherein the end frame has a plurality of guide portions extending radially outside of the rotating shaft, each of the guide portions having a guide groove extending in a perpendicular direction to the rotating shaft for slidably receiving therein an assembly line transfer rail.

10. The motor device according to claim 9, wherein the end frame has inserting portions provided between the plurality of guide portions to receive therein fixing members which fix the end frame to the motor yoke in a direction of the rotating shaft.

11. The motor device according to claim 10, wherein the guide portions are provided at four positions, two guide grooves of a first pair of the guide portions being in line and separated by one of the inserting portions, and two guide grooves of a second pair of the guide portions being in line and separated by another one of the inserting portions, the two guide grooves of the first pair of the guide portions and the two guide grooves of the second pair of the guide portions being in parallel with each other.

12. The motor device according to claim 9, wherein one of the guide portions is shorter than another of the guide portions in an assembly line transfer rail engagement direction.

13. A motor device, comprising:
   a motor yoke having a rotating shaft housed therein;
   an end frame having a plurality of sliding parts for slidably engaging the end frame with an assembly line transfer rail; and
   an inserting part located between adjacent sliding parts for attaching the motor yoke to the end frame, wherein
   the plurality of sliding parts are formed respectively in parallel with a direction substantially orthogonal to the rotating shaft and arranged symmetrically relative to a line connecting the rotating shaft.

14. The motor device according to claim 13, wherein one of the sliding parts is shorter than another of the sliding parts in an assembly line transfer rail engagement direction.

* * * * *